Patented May 30, 1950

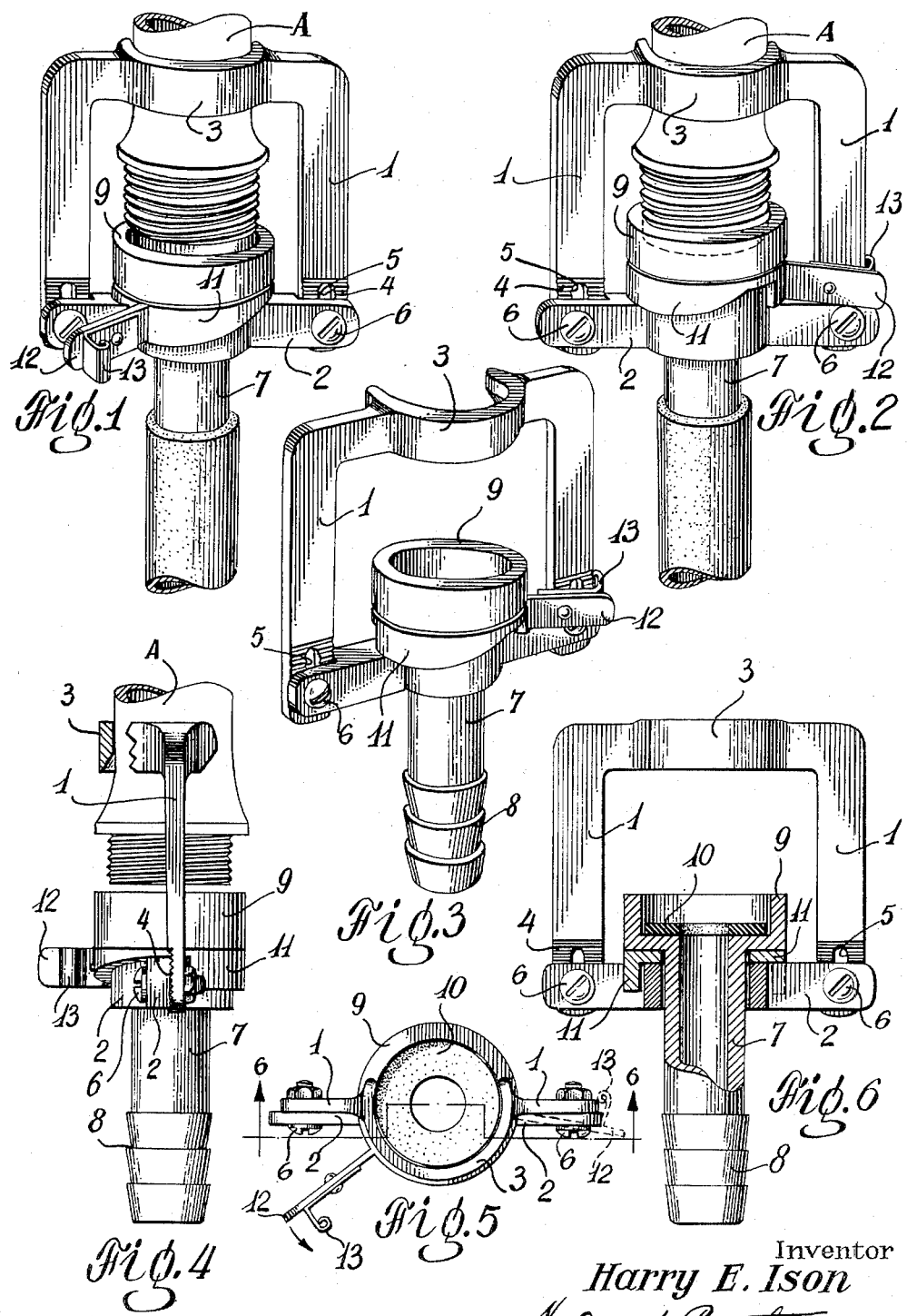

2,509,925

UNITED STATES PATENT OFFICE 2,509,925

PIPE COUPLING

Harry Edwin Ison, Dorchester, New Brunswick, Canada

Application April 11, 1949, Serial No. 86,626

2 Claims. (Cl. 285—177)

This invention relates to a pipe coupling and more particularly to a pipe coupling of the clamp type.

An object of this invention is to provide a quick and easy way of coupling a flexible hose or the like to any type of flanged pipe, and more particularly to a faucet.

Another object of this invention is to provide a device which can be easily and quickly attached in the dark and by persons not mechanically inclined.

Another important object of this invention is to provide an efficient attachment of a flexible hose to a faucet without the need of any threaded parts, thus eliminating any screwing operation and any easily damageable parts.

Another important object of this invention is to provide a device which can be attached to ordinary standard devices even if the threading is worn out.

Another important object is to provide a coupling which will remain secure in spite of twisting and turning of the attached hose.

Another important object of this invention is to provide a type of coupling which is inexpensive to manufacture, consisting of a minimum of essential parts which may be moulded or cast.

The foregoing and other important objects will become apparent in the following disclosure.

Referring now to the drawings, wherein like numerals refer to like parts.

Fig. 1 is a perspective view of my invention about to be clamped to a spigot;

Fig. 2 is a perspective view of the same clamped to a spigot;

Fig. 3 is another perspective view of my invention without the spigot and the hose;

Fig. 4 is a side elevation;

Fig. 5 is a plan view of my invention, without the spigot;

Fig. 6 is an elevation partly in section along line 6—6 of Fig. 5.

In a preferred embodiment of my invention, which can be adapted to a wide variety of flanged spigots A, to a yoke 1 is removably and adjustably secured a crosspiece 2 having a circular aperture therethrough in substantial alignment with a corresponding half ring or recess 3 formed in the bridge part of the yoke 1.

The yoke 1 has serrated ends 4 and slots 5 near said ends, for adjustably securing the crosspiece 2, similarly serrated at its ends, by means of fasteners 6 engaging said slots.

A coupling member, inserted in the circular opening of the crosspiece 2, has a bored cylindrical body 7, formed at one end 8 for securely holding an attached hose or the like, and a dependent upper cup 9 of larger diameter in seating engagement with the spigot A. A washer 10, at the bottom of the cup 9 ensures a sealed connection between said spigot and said coupling member.

To clamp the coupling member against the spigot, a cam ring or collar 11 is fitted around said coupling member between the cup 9 and the crosspiece 2. This collar raises the cup against the spigot when rotated by means of the lever or finger projection 12. A small spring or snap fastener 13 attached to the end of the projection 12, comes into engagement with a leg of the yoke 1, when the collar 11 is rotated thereby preventing any undue loosening of the coupling.

The collar 11 has a flat upper face, and a lower face forming two cams diametrically opposed so as to rest on both sides of the crosspiece 2 thereby ensuring an evenly distributed pressure of the base of the cup against the lower end of the spigot A.

In its operation, the device is simply brought under the spigot, the semi-ring 3 engaged above the flange of the spigot, and the finger grip is rotated in a clockwise direction to snap the spring 13 in position against the yoke 1, thereby pressing the coupling member in seating relationship with the spigot A.

Thus it is seen, that the device is very easily and quickly put in place. To fit different sizes of spigots, the crosspiece 2 may be adjusted by means of bolts 6 to bring about the desired contact pressure between the base of the cup and the spigot when the coupling member is raised.

While I have thus described a preferred embodiment of my invention, it should be understood that many variations of the same may be readily arranged without departing from the scope and spirit of the present invention.

Having thus described my invention, I claim:

1. A pipe coupling comprising a yoke having its crossbar in the form of a half ring for engagement with a flanged spigot, a crosspiece removably and adjustably secured to the ends of said yoke, having a circular aperture in alignment with the half ring of said yoke, a bored cylindrical coupling member, in engagement in said apertured crosspiece, said coupling member being terminated at its upper end by a cup of larger diameter than that of said member, a washer in said cup, and a collar in engagement with said coupling member with a lower cam face cooperating with the apertured crosspiece, to provide upon its rotation a tight connection by its lifting action upon the coupling member.

2. A coupling device as in claim 1, said cam collar having a lever for rotation and a spring at the end thereof, engageable with one leg of the yoke to securely hold said collar.

HARRY EDWIN ISON.

No references cited.